United States Patent
Chou et al.

(10) Patent No.: US 7,669,047 B2
(45) Date of Patent: *Feb. 23, 2010

(54) BIOMETRICS SIGNAL INPUT DEVICE AND COMPUTER SYSTEM HAVING THE BIOMETRICS SIGNAL INPUT DEVICE

(75) Inventors: Bruce C. S. Chou, Hsin Chu (TW); Jer-Wei Chang, Hsin Chu (TW)

(73) Assignee: EGIS Technology Inc., Hsinchu (TW)

(*) Notice: Subject to any disclaimer, the term of this patent is extended or adjusted under 35 U.S.C. 154(b) by 588 days.

This patent is subject to a terminal disclaimer.

(21) Appl. No.: 11/455,732

(22) Filed: Jun. 20, 2006

(65) Prior Publication Data

US 2006/0294359 A1 Dec. 28, 2006

(30) Foreign Application Priority Data

Jun. 22, 2005 (TW) .............................. 94120726 A

(51) Int. Cl.
G06F 9/00 (2006.01)
G06F 15/177 (2006.01)
(52) U.S. Cl. ......................................................... 713/2
(58) Field of Classification Search ....................... 713/2
See application file for complete search history.

(56) References Cited

U.S. PATENT DOCUMENTS 5,867,802 A * 2/1999 Borza ........................ 340/5.53

| | | | | |
|---|---|---|---|---|
| 7,174,463 B2 * | 2/2007 | Cromer et al. | ............... | 713/186 |
| 2003/0097585 A1 | 5/2003 | Girard | | |
| 2006/0064577 A1 | 3/2006 | Chiu et al. | | |

FOREIGN PATENT DOCUMENTS

| GB | 2 408 825 | 8/2005 |
|---|---|---|
| TW | 513512 | 12/2002 |
| TW | 584295 | 4/2004 |
| TW | 268676 | 6/2005 |

* cited by examiner

*Primary Examiner*—Thomas Lee
*Assistant Examiner*—Mohammed H Rehman
(74) *Attorney, Agent, or Firm*—Muncy, Geissler, Olds & Lowe, PLLC

(57) ABSTRACT

A biometrics signal input device with a USB interface is connected to a computer apparatus to control BIOS booting procedures of the computer apparatus. The computer apparatus communicates with a USB controller of the input device through the USB interface according to a USB communication protocol and regards this device as a USB device. Then, the computer apparatus executes a program stored in a memory of the input device and enables a biometrics sensor to read biometrics data of a user. Then, to-be-identified biometrics data and biometrics template data pre-stored in the memory are transferred to a main memory of the computer apparatus. A CPU of the computer apparatus compares the to-be-identified biometrics data with the biometrics template data. After the comparison passes, the BIOS booting procedures are allowed to be continued until the CPU has completely loaded an operation system stored in a main storage device of the computer apparatus.

11 Claims, 4 Drawing Sheets

BIOMETRICS SIGNAL INPUT DEVICE AND COMPUTER SYSTEM HAVING THE BIOMETRICS SIGNAL INPUT DEVICE

BACKGROUND OF THE INVENTION

1. Field of the Invention

The invention relates to a biometrics signal input device, a computer system with the biometrics signal input device, and a control method thereof. The invention also correlates to the commonly assigned patent: U.S. patent application Ser. No. 11/229,645 (US20060064577A1), filed on Sep. 20, 2005 and entitled "BIOS LOCKING DEVICE, COMPUTER SYSTEM WITH A BIOS LOCKING DEVICE AND CONTROL METHOD THEREOF".

2. Description of the Related Art

The conventional method for protecting the personal data is often made by way of password protection. However, using the password to protect the personal data is troublesome because the user tends to forget the password and the password may also be dangerously cracked.

Thus, adding a biometrics authentication device to replace the password input has become an important technology development. The fingerprint authentication device is used most frequently because the fingerprint recognition method is well developed.

Conventionally, the major problem of integrating the fingerprint authentication device with the computer BIOS for the purpose of Pre-Boot-Authentication (PBA) is limited by the specification of the commercial BIOS architecture. For example, the capacity limitation of the ROM chip (storing BIOS code) of the computer is insufficient for extra codes of fingerprint matching program (at least 100 Kbytes), and the fingerprint template file. Thus, it is very difficult to store the fingerprint matching program in the ROM chip according to the commercial specification of the current computer.

Alternatively, it is possible to increase the capacity of the ROM chip for storing BIOS codes so that the fingerprint matching program and application program can be stored therein. However, the storage of the fingerprint template data has become a big problem because the user may need to update the fingerprint template data. If the fingerprint template data is to be stored in the ROM chip for storing the BIOS codes, it is impossible to satisfy the requirement of updating the data by the user himself or herself.

It is possible to provide a stand-alone module of fingerprint authentication device, which captures and matches the fingerprint in this module, to solve this problem, wherein the BIOS ROM chip does not store the fingerprint matching program and fingerprint template data. However, such a stand-alone module has a high cost. For example, there is an advanced microprocessor, such as the 32-bit RISC processor or the DSP chip inside to perform the image processing and matching of the fingerprint data, and the total cost of the advanced microprocessor, the fingerprint sensor and related flash memory and the random access memory (RAM) is very high. Thus, the stand-alone fingerprint module is very expensive and cannot be easily popularized in the PBA of the computer system.

In order to solve the problem of high cost, US20060064577A1 patent discloses a BIOS locking device having a memory for storing software (including biometrics matching and application programs) and fingerprint template data, a USB controller and a biometrics sensor (e.g., a fingerprint sensor), wherein the BIOS ROM chip of the computer regards this device as an booting disk, such as "A:" disk, and enables the fingerprint application program to finish the fingerprint authentication procedure. This method, which is completely different from the prior art, uses the stand-alone fingerprint module for controlling the PBA of the computer with a very low cost, and may be easily popularized.

To extend the US20060064577A1 patent spirit, this invention provides a biometrics signal input device capable of diversifying the locking control of the booting procedure more effectively, a computer system having the biometrics signal input device ad a control method thereof.

SUMMARY OF THE INVENTION

It is therefore an object of the invention to provide a biometrics signal input device, a computer system having the biometrics signal input device and a control method thereof, wherein the authority of booting the computer system is controlled by way of fingerprint authentication to protect the data of the computer system.

Another object of the invention is to provide a low-cost biometrics signal input device serving as a BIOS locking device without any build-in authentication processor, wherein the locking device may be connected to a computer system without modifying any hardware device of the computer system and the CPU of the computer downloads the program codes of the BIOS ROM chip and executes the fingerprint authentication to control the BIOS booting authority of the computer system.

Still another object of the invention is to provide a biometrics signal input device serving as a BIOS locking device with a build-in serial NOR flash having a small size, a large capacity, and a low cost such that the application programs and the fingerprint biometrics data need not to be stored in the BIOS ROM chip. Thus, only the device has to be configured, and the BIOS ROM chip does not have to be modified. In addition, using the serial NOR flash can reduce the number of pins and the size of the USB controller so that the size of the device can be greatly reduced.

Yet still another object of the invention is to provide a biometrics signal input device serving as a BIOS locking device without additionally installed driver, wherein a biometrics sensor of the locking device is recognized as a stand-along memory, and the BIOS ROM chip only needs to control this device.

Yet still another object of the invention is to provide a computer system, which has a biometrics signal input device serving as a BIOS locking device and is free from being influenced by the operation system, and a control method thereof.

To achieve the above-identified objects, the invention provides a biometrics signal input device connected to a computer apparatus. The computer apparatus mainly includes a central processing unit (CPU), a main memory, a BIOS ROM chip, a main storage device, a user interface and a host interface. The biometrics signal input device is connected to the computer apparatus through the host interface. The biometrics signal input device mainly includes a controller, a biometrics sensor and a memory. The controller provides a device interface to be connected to the host interface. The biometrics sensor is connected to the controller. The memory is connected to the controller. When the computer apparatus is turned on, a hardware detecting and initializing operation is performed using a program code in the BIOS ROM chip to detect and initialize the CPU, the main memory, the user interface and the host interface. When the biometrics signal input device connected to the host interface is detected, the hardware detecting and initializing operation is paused, and programs or data stored in the memory is downloaded to the computer apparatus and executed or processed, so that an operation environment is established. The CPU enables a biometrics matching and application program in the operation environment so as to provide a human-machine interface to guide a user to use the biometrics sensor to perform a biometrics data matching operation. In the biometrics data matching operation, the human-machine interface guides a to-be-identified user to perform an authentication procedure, the controller controls the biometrics sensor to sense to-be-identified biometrics data of the to-be-identified user, the CPU reads and processes the to-be-identified biometrics data from the controller and compares the processed to-be-identified biometrics data and fingerprint template data stored in the memory, and the hardware detecting and initializing operation is continued, when the processed to-be-identified biometrics data and the fingerprint template data substantially match with each other, so as to detect and initialize the main storage device and enable a main operation system stored in the main storage device to be loaded into the CPU and executed to complete a booting operation.

The invention also provides a computer system using the biometrics signal input device and a control method thereof.

DETAILED DESCRIPTION OF THE INVENTION

The BIOS (Basic Input/Output System) includes the hardware initialization/detection codes for initializing and detecting the hardware devices of the computer apparatus and then downloading the operation system from the main storage device and the sub-program codes for controlling the display of the monitor, driving the disk drive, controlling the joystick, and controlling other peripheral I/O devices. The codes are integrated into a BIOS ROM chip when the IBM company configured the first personal computer since 1981.

Figure 1:
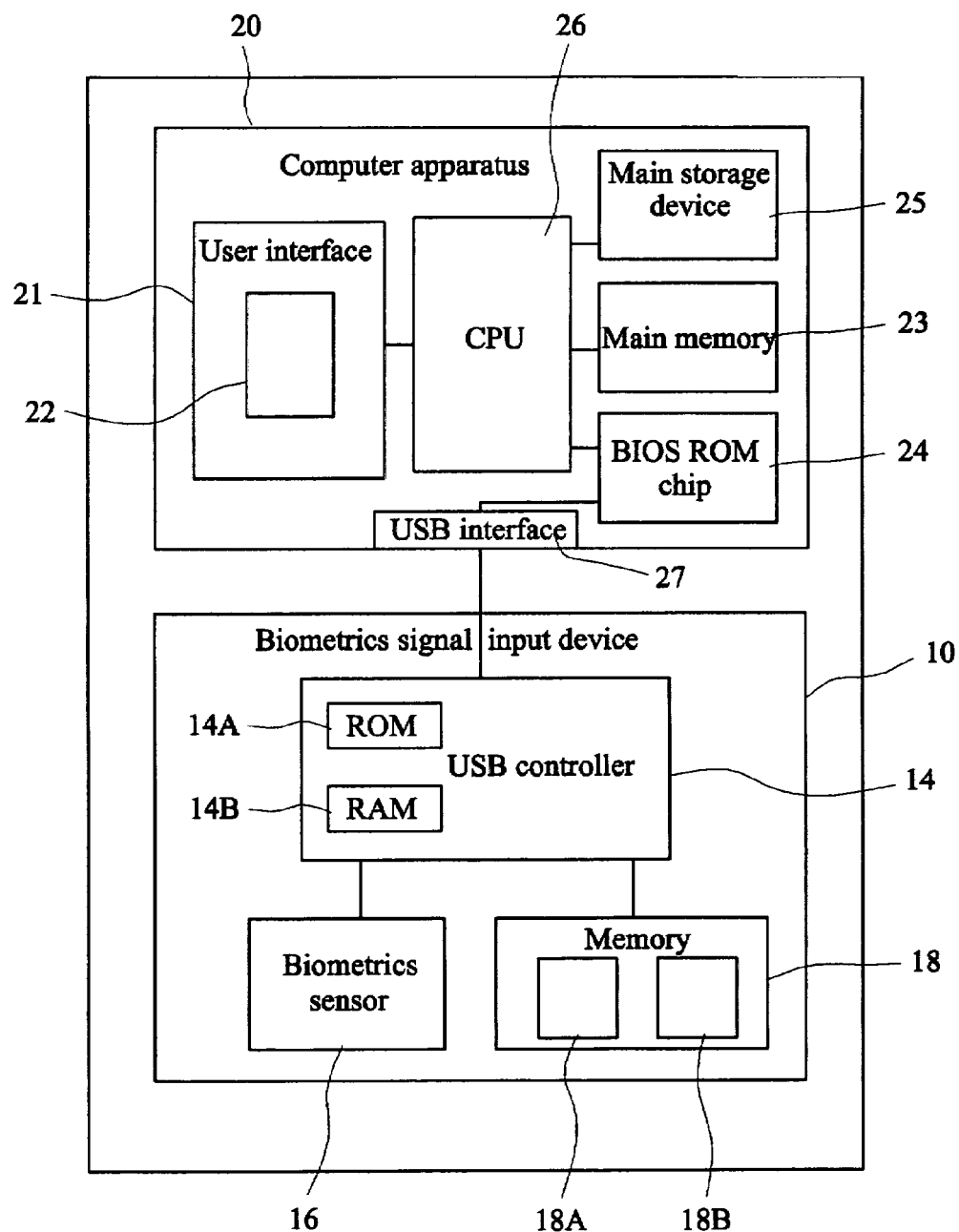
FIG. 1 is a block diagram showing a computer system having a biometrics signal input device according to a preferred embodiment of the invention.

FIG. 1 is a block diagram showing a computer system having a biometrics signal input device 10 according to a preferred embodiment of the invention. As shown in FIG. 1, the biometrics signal input device 10 of this embodiment is basically a USB (universal serial bus) interface device connected to a computer apparatus 20. The computer apparatus 20 may be, for example, a personal computer (PC), a server computer, a personal digital assistant (PDA) or a mobile phone. The computer apparatus 20 mainly includes a central processing unit (CPU) 26, a main memory 23, a BIOS ROM chip 24, a main storage device 25, a user interface (e.g., a screen, a keyboard and a mouse) 21 and a host interface such as a USB interface 27.

The biometrics signal input device 10 is connected to the computer apparatus 20 through the USB interface 27. The biometrics signal input device 10 mainly includes a controller 14, which is a USB controller in this embodiment, a biometrics sensor 16 and a memory 18. The USB controller 14 provides a device interface connected to the USB interface 27. The biometrics sensor 16 is connected to the USB controller 14.

The USB controller 14 may further include a ROM (Read Only Memory) 14A and a random access memory (RAM) 14B. The ROM 14A stores firmware for plug-and-play with the computer apparatus 20. The firmware stored in the ROM 14A contains the protocol for the communication with the computer apparatus 20. When the computer apparatus 20 is powered on, the biometrics signal input device is regarded as a USB device with storage function. Then, the computer apparatus 20 communicates with the device according to the standard USB communication protocol, and automatically links with and accesses the software or data stored in the memory 18. The software or data is automatically downloaded to the main memory 23 of the computer apparatus 20 and then executed or processed. The RAM 14B serves as a buffer for data processing.

The biometrics sensor 16 may be a fingerprint sensor, a voice sensor, an optical image sensor like CCD or CMOS image sensor for face recognition or an iris pattern sensing or any other biometrics sensor like finger or palm vein sensor. In this embodiment, the fingerprint sensor is a chip-type fingerprint sensor including an area-type or a sweep-type fingerprint sensor, so that the product can be miniaturized.

The memory 18 is connected to the USB controller 14. In this invention, the memory 18 is mainly a serial NOR flash (hereinafter referred to as a NOR Flash, such as the product of Atrnel AT45DB041B), but may be an NAND flash, any other type of flash memory, or any other non-volatile memory. The memory 18 is divided into a public block 18A for storing programs, which may include a personalized operation system (hereafter referred to as POS) and a biometrics matching and application program, and a private block 18B, which stores personal data (e.g., name, address and the like) or biometrics template data. In another embodiment, the memory 18 may only store data. In this situation, the biometrics matching and application program and the BIOS code are integrated together, and no POS is needed.

The public block 18A may further store an encryption/decryption application program, and the private block 18B further stores an encryption/decryption key. The CPU 26 loads the encryption/decryption application program and the encryption/decryption key to encrypt/decrypt the data stored in the private block 18B.

When the computer apparatus 20 is turned on, a program code in the BIOS ROM chip 24 is used to execute a hardware detecting and initializing operation for detecting and initializing the CPU 26, the main memory 23, the user interface 21 and the USB interface 27.

Then, the USB device 10 configured to have the storage function is detected, and the hardware detecting and initializing operation is paused. The programs or data in the memory 18 are loaded into the computer apparatus 20 for executing or processing according to the USB communication protocol. The programs in the memory 18 substantially include the matching software and the user interface program. In another condition, the matching software is combined with the BIOS code and compiled into a program code, and an operation environment is established when the BIOS proceeds to a suitable stage. At this time, the matching software is executed in the environment, and the fingerprint data only can be read from the memory according to the communication protocol. If a POS operation environment has to be established, a POS, which may be a Linux platform or a DOS platform, may be stored in the public block.

Next, the CPU 26 enables the biometrics matching and application program in the POS operation environment or the BIOS operation environment so as to provide a human-machine interface to guide a user to use the biometrics sensor 16 to perform a biometrics data enrolling operation or a biometrics data matching operation. The computer apparatus 20 can automatically make a judgement and execute the biometrics data enrolling operation or the biometrics data matching operation. The biometrics matching and application program also compares the fingerprint data and sends a message back after the comparison passes such that the subsequent booting procedure can be continued until the main operation system stored in the main storage device of the computer system is completely loaded.

The human-machine interface is displayed or shown on the user interface 21 (e.g., a display or a speaker) in the computer apparatus 20. Thus, the human-machine interface can guide the user to use the biometrics sensor 16 via voice, texts, or pictures.

Alternatively, when the biometrics matching and application program detects that no biometrics template data is stored in the memory 18, the human-machine interface further guides the user to select whether the template data enrolling operation has to be performed.

In the biometrics data enrolling operation, the human-machine interface guides an authorized user to enroll the data, and the USB controller 14 controls the biometrics sensor 16 to sense authorized biometrics data of the authorized user. Then, the CPU 26 reads the authorized biometrics data from the USB controller 14, processes the authorized biometrics data into the biometrics template data, and stores the biometrics template data in the memory 18. In addition, the biometrics template data may further be stored in the main storage device 25 for the purpose of backup.

In the biometrics data matching operation, the human-machine interface guides a to-be-identified user to perform an authentication procedure, and the USB controller 14 controls the biometrics sensor 16 to sense to-be-identified biometrics data of the to-be-identified user. Then, the CPU 26 reads from the USB controller 14, processes the to-be-identified biometrics data and compares the processed data with the template matching data stored in the memory 18 so as to determine whether they substantially match with each other. If they match with each other substantially, the hardware detecting and initializing operation is continued to detect and initialize the main storage device 25, and a main operation system stored in the main storage device 25 is loaded into the CPU 26 so that a booting operation is completed.

The main object of integrating the biometrics signal input device 10 with the computer apparatus 20 is to utilize the personal biometrics feature to replace the conventional password login and serve as a BIOS locking device before the main operation system (e.g., Microsoft operation system, Macintosh operation system, Linux operation system or any other operation system) is loaded. The integrating method is to design the biometrics signal input device 10 as a USB device having the storage function and to set the priority of enabling the USB device and associated biometrics authentication procedures be higher than the main storage device 25 in the BIOS code through the BIOS code definition. Then, the biometrics signal input device 10 may serve as the biometrics signal input device for controlling the BIOS booting procedure (details thereof will be described hereinbelow). Another object is to enable this biometrics signal input device 10 to control the authority of using other application programs after the main operation system of the computer is loaded.

After the booting operation completes, the biometrics signal input device 10 serves as a biometrics signal reader in the main operation system so as to input a biometrics signal to the computer apparatus 20.

In practice, the biometrics template data (e.g., fingerprint data) at the first usage may be enrolled in the BIOS operation environment or the POS operation environment, through the human-machine interface, which guides the user using texts, pictures or voice. Alternatively, if the system detects that no biometrics template data is stored in the memory 18, and thus directly enters the main operation system, which provides a human-machine interface through an application program to complete the enrolling of the biometrics template data. Another important object of the invention is that the biometrics template data is stored in the memory 18. Thus, it is possible to perform the biometrics matching function immediately when the old hard drive is out of work and a new hard drive is connected to the computer system. In another embodiment, it is also possible to store the biometrics template data in the main storage device (e.g., a hard drive) 25 according to the requirement so as to achieve the purpose of backup and prevent the influence cause by the damage of the memory 18.

In application, the biometrics signal input device of the invention may be embedded into the computer apparatus in one embodiment. At this time, the used memory is a serial NOR flash. In another embodiment, the input device using the serial NOR flash may be inserted into the computer apparatus in a manner like an external USB key, and simply serves as a key for controlling the booting procedure of the computer apparatus. Alternatively, the input device may be combined with or the typical fingerprint mobile disk such that two functions may be possessed, and the selected memory is the NAND flash. In this case, the operating method of the device is similar to the memory storage device disclosed in the US20060064577A1 patent to serve as the BIOS locking device for controlling the booting procedure, as well as to protect the data stored in the memory of the mobile disk. In this case, the computer apparatus may be configured such that the booting operation is disabled when the biometrics signal input device is disconnected from the computer apparatus.

In still another embodiment of the invention, all integrated circuit elements and the sensor included in the biometrics signal input device can be totally or partially integrated on the single chip, which is advantageous to the reduction of the cost and size of the device.

The biometrics matching and application program judges whether the user uses the biometrics signal input device at the first time. If yes, the fingerprint sensor is enabled to read the fingerprint and process the fingerprint into an authorized data template, which may include multiple fingerprint data templates of a single authorized user or multiple authorized users. Alternatively, when the biometrics matching and application program detects that the memory 18 has no biometrics template data, the human-machine interface further guides the user to select whether the biometrics data enrolling operation has to be performed.

Figure 2:
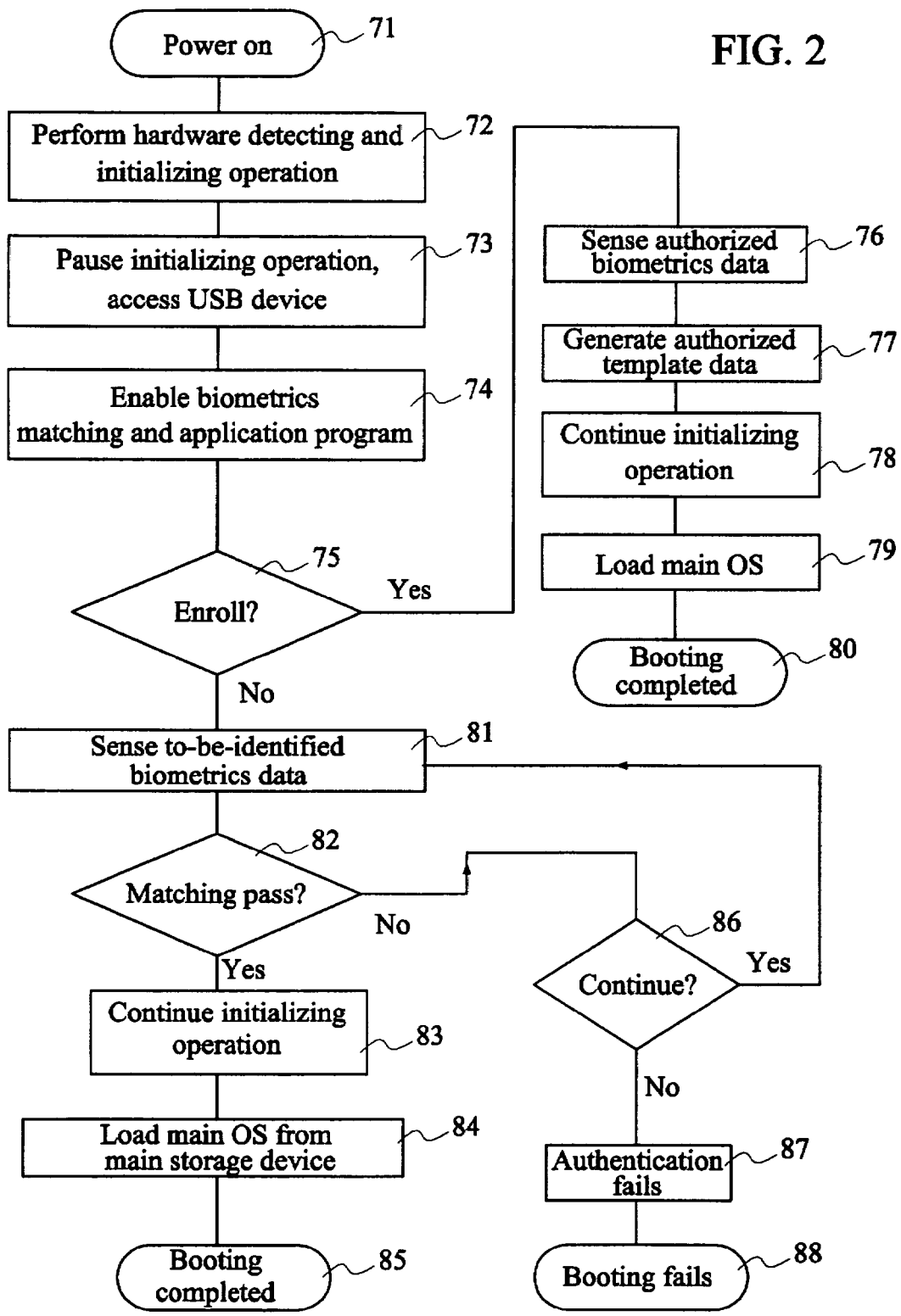
FIG. 2 is a flow chart showing a control method for a computer system having a biometrics signal input device according to a first embodiment of the invention.

FIG. 2 is a flow chart showing a control method for a computer system having a biometrics signal input device according to a first embodiment of the invention. As shown in FIGS. 2 and 1, the control method of the invention includes the following steps.

First, the power of the computer apparatus 20 is turned on, as shown in step 71. Next, the BIOS ROM chip 24 executes a hardware detecting and initializing operation to detect and initialize the CPU 26, the main memory 23, the user interface 21 and the USB interface 27 of the computer apparatus 20.

Then, the computer apparatus 20 detects and initializes the USB biometrics signal input device 10 having the storage function, as shown in step 72. Next, the hardware detecting and initializing operation is paused and the biometrics signal input device 10 is controlled and accessed. Then, the programs or data stored in the memory 18 of the biometrics signal input device 10 are downloaded to the CPU 26 and executed or processed so that a POS operation environment is established. In addition, the biometrics matching and application program is enabled in the POS operation environment or the BIOS operation environment, as shown in step 74. Then, the biometrics matching and application program provides the human-machine interface to guide the user to use the biometrics sensor 16 of the biometrics signal input device 10 so as to perform the biometrics data enrolling operation or the biometrics data matching operation, as shown in step 75.

When the biometrics matching and application program detects that the memory 18 has no biometrics template data, the human-machine interface further guides the user to select whether the biometrics data enrolling operation has to be performed. If the authorized user selects to perform the enrolling operation, the human-machine interface guides the authorized user to enroll the data, the USB controller 14 controls the biometrics sensor 16 to sense the authorized biometrics data of the authorized user, as shown in step 76. Then, the CPU 26 reads the authorized biometrics data from the USB controller 14 and processes the authorized biometrics data into the biometrics template data, which is stored in the memory 18, as shown in step 77. Next, the BIOS ROM chip 24 continues to finish the hardware detecting and initializing operation, as shown in step 79, so as to detect and initialize the main storage device 25, and to enable the main operation system stored in the main storage device 25 to be loaded into the CPU 26 to complete the booting operation, as shown in step 80.

When the biometrics matching and application program detects that the memory 18 has the biometrics template data, the human-machine interface further guides the to-be-identified user to perform the biometrics data matching operation. The USB controller 14 controls the biometrics sensor 16 to sense to-be-identified biometrics data of the to-be-identified user, as shown in step 81. The CPU 26 reads and processes the to-be-identified biometrics data from the USB controller 14 and compares the to-be-identified biometrics data with the biometrics template data stored in the memory 18 to determine whether they substantially match with each other, as shown in step 82. Then, if they substantially match with each other, the hardware detecting and initializing operation is continued to detect and initialize the main storage device 25, as shown in step 83, and the main operation system stored in the main storage device 25 is loaded into the CPU 26 to complete the booting operation, as shown in steps 84 and 85. If the comparison fails, the user can select to try again, as shown in step 85. If the user selects to try again, the procedure goes back to step 81; or otherwise the authentication fails, as shown in step 87, and the booting operation fails, as shown in step 88.

Figure 3:
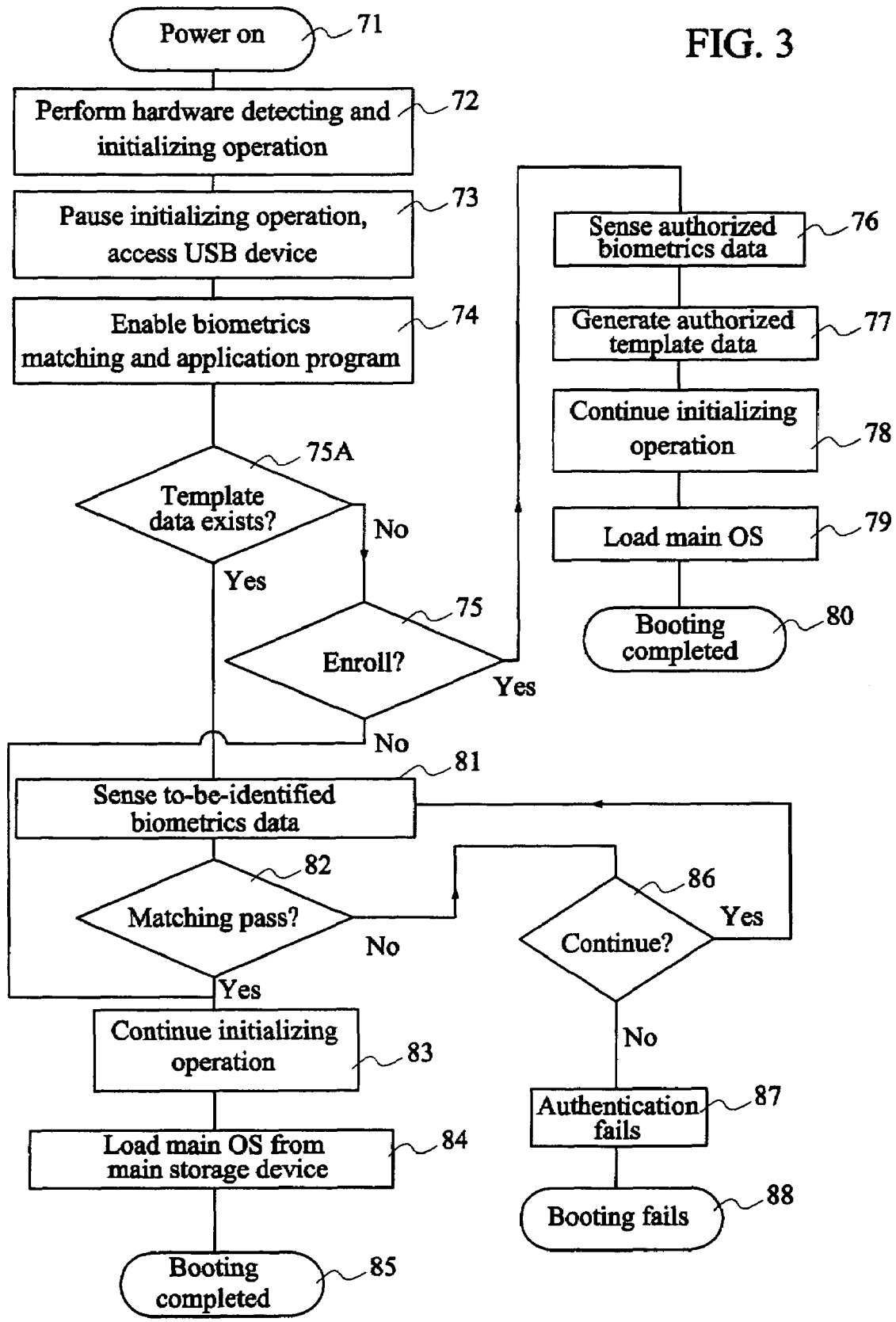
FIG. 3 is a flow chart showing a control method for a computer system having a biometrics signal input device according to a second embodiment of the invention.

FIG. 3 is a flow chart showing a control method for a computer system having a biometrics signal input device according to a second embodiment of the invention. As shown in FIG. 3, this embodiment is similar to the first embodiment except that the control method further includes the step 75A of automatically judging whether the computer system has the biometrics template data. If yes, the biometrics data matching operation is executed. If not, the computer asks the user whether he or she wants to perform the biometrics data enrolling operation, as shown in step 75. If the user selects to perform the biometrics data enrolling operation, the procedure jumps to step 76. If the user selects not to perform the biometrics data enrolling operation, the procedure jumps to step 83 to continue the hardware detecting and initializing operation and the subsequent booting operation. Consequently, the user can select to perform the biometrics data enrolling operation in the main operation system.

Figure 4:
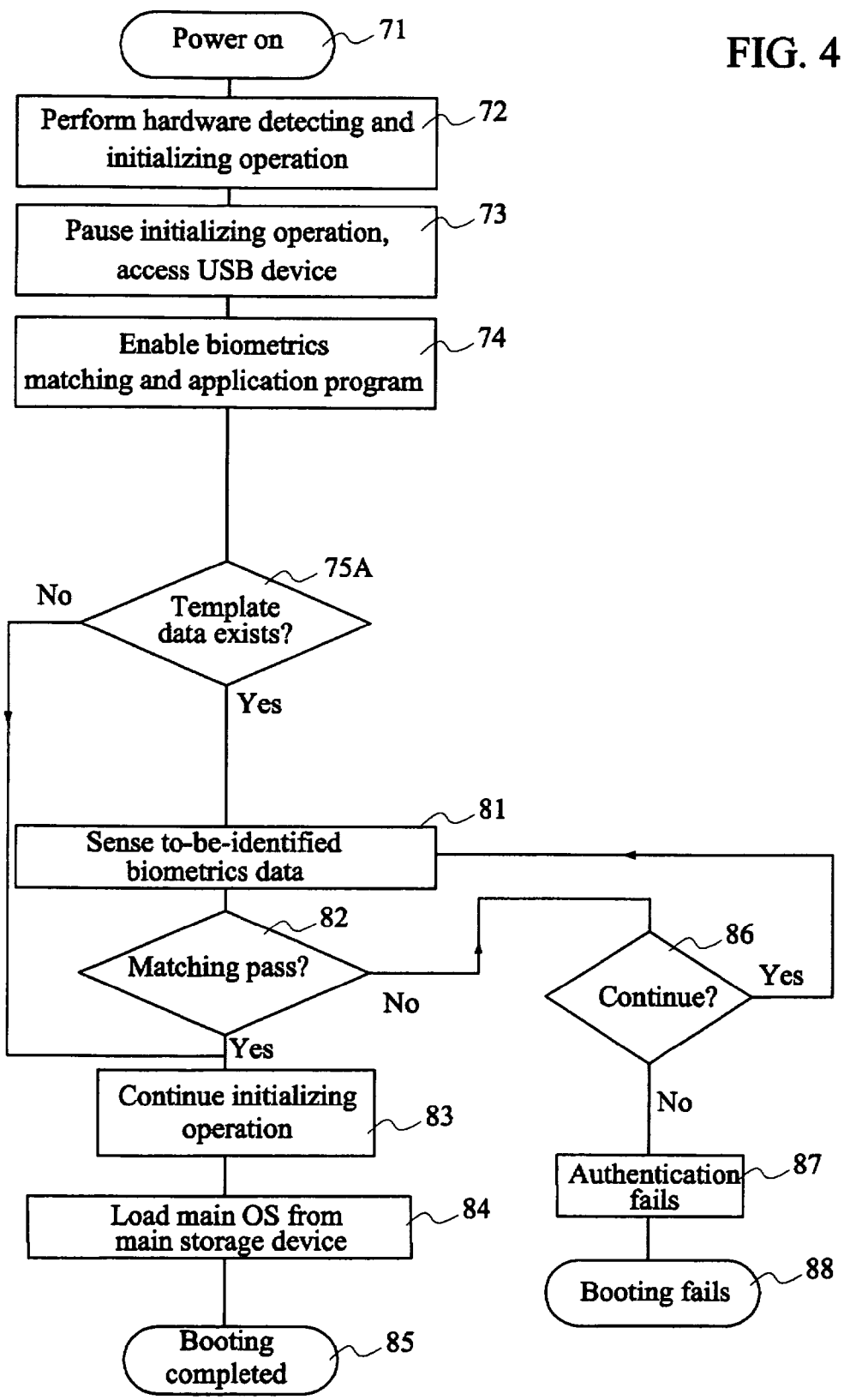
FIG. 4 is a flow chart showing a control method for a computer system having a biometrics signal input device according to a third embodiment of the invention.

FIG. 4 is a flow chart showing a control method for a computer system having a biometrics signal input device according to a third embodiment of the invention. As shown in FIG. 4, this embodiment is similar to the second embodiment except that the step 75A automatically judges whether the computer system has the biometrics template data. If yes, the biometrics data matching operation is performed. If not, the computer system asks the user whether he or she wants to execute the biometrics data enrolling operation and the procedure jumps to step 83 to continue the hardware detecting and initializing operation and the subsequent booting operation. Consequently, the user can select to perform the biometrics data enrolling operation in the main operation system.

It is to be noted that the USB device with the storage function may be regarded as an interface using the USB protocol as the standard communication protocol. The main spirit resides in that the storage function can solve the capacity restriction in the prior art BIOS ROM chip, which cannot store the matching and application program easily, or cannot store the fingerprint template or other data because no repeated access is allowed. The USB interface still can be replaced by any other standard interface.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A biometrics signal input device to be connected to a computer apparatus, the computer apparatus mainly comprising a central processing unit (CPU), a main memory, a BIOS (Basic Input/Output System) ROM (Read Only Memory) chip, a main storage device, a user interface and a host interface, through which the biometrics signal input device is connected to the host interface, the biometrics signal input device comprising:

a controller for providing a device interface to be connected to the host interface;
a biometrics sensor connected to the controller; and
a memory connected to the controller, wherein:
when the computer apparatus is turned on, a hardware detecting and initializing operation is performed using a program code in the BIOS ROM chip to detect and initialize the CPU, the main memory, the user interface and the host interface;
when the biometrics signal input device connected to the host interface is detected, the hardware detecting and initializing operation is paused, and programs or data stored in the memory of the biometrics signal input device is downloaded to the computer apparatus and executed or processed, so that an operation environment is established;
the CPU enables a biometrics matching and application program in the operation environment so as to provide a human-machine interface to guide a user to use the biometrics sensor to perform a biometrics data matching operation;

in the biometrics data matching operation, the human-machine interface guides a to-be-identified user to perform an authentication procedure, the controller controls the biometrics sensor to sense to-be-identified biometrics data of the to-be-identified user, the CPU reads and processes the to-be-identified biometrics data from the controller and compares the processed to-be-identified biometrics data and biometrics template data stored in the memory of the biometrics signal input device, and the hardware detecting and initializing operation is continued, if the processed to-be-identified biometrics data and the biometrics template data match with each other, so as to detect and initialize the main storage device and enable a main operation system stored in the main storage device to be loaded into the CPU and executed to complete a booting operation, wherein the main storage device is detected and initialized after the processed to-be-identified biometrics data and the biometrics template data match with each other, and after the CPU, the main memory, the user interface and the host interface are detected and initialized; and the operation environment is established before the biometrics sensor senses the to-be-identified biometrics data of the to-be-identified user.

2. The device according to claim 1, wherein the memory of the biometrics signal input device comprises:

a public block for storing a personalized operation system and the biometrics matching and application program; and a private block for storing personal data or the biometrics template data.

3. The device according to claim 2, wherein the public block further stores an encryption/decryption application program, the private block further stores an encryption/decryption key, and the CPU loads the encryption/decryption application program and the encryption/decryption key to encrypt/decrypt the personal data or the biometrics template data.

4. The device according to claim 1, wherein the human-machine interface is displayed on the user interface of the computer apparatus.

5. The device according to claim 1, wherein after the booting operation is finished, the biometrics signal input device serves as a biometrics signal reader in the main operation system so as to input a biometrics signal to the computer apparatus.

6. A computer system, comprising:

a computer apparatus, which comprises a central processing unit (CPU), a main memory, a BIOS (Basic Input/Output System) ROM (Read Only Memory) chip, a main storage device, a user interface and a host interface; and a biometrics signal input device connected to the computer apparatus through the host interface, wherein the biometrics signal input device comprises:

a controller, which provides a device interface to be connected to the host interface;

a biometrics sensor connected to the controller; and a memory connected to the controller, wherein:

when the computer apparatus is turned on, a hardware detecting and initializing operation is performed using a program code in the BIOS ROM chip to detect and initialize the CPU, the main memory, the user interface and the host interface;

when the biometrics signal input device connected to the host interface is detected, the hardware detecting and initializing operation is paused, and programs or data stored in the memory of the biometrics signal input device is downloaded to the computer apparatus and executed or processed, so that an operation environment is established;

the CPU enables a biometrics matching and application program in the operation environment so as to provide a human-machine interface to guide a user to use the biometrics sensor to perform a biometrics data matching operation;

in the biometrics data matching operation, the human-machine interface guides a to-be-identified user to perform an authentication procedure, the controller controls the biometrics sensor to sense to-be-identified biometrics data of the to-be-identified user, the CPU reads and processes the to-be-identified biometrics data from the controller and compares the processed to-be-identified biometrics data and biometrics template data stored in the memory of the biometrics signal input device, and the hardware detecting and initializing operation is continued, if the processed to-be-identified biometrics data and the biometrics template data match with each other, so as to detect and initialize the main storage device and enable a main operation system stored in the main storage device to be loaded into the CPU and executed to complete a booting operation, wherein the main storage device is detected and initialized after the processed to-be-identified biometrics data and the biometrics template data match with each other, and after the CPU, the main memory, the user interface and the host interface are detected and initialized; and the operation environment is established before the biometrics sensor senses the to-be-identified biometrics data of the to-be-identified user.

7. The computer system according to claim 6, wherein the memory of the biometrics signal input device comprises:

a public block for storing a personalized operation system and the biometrics matching and application program; and a private block for storing personal data and the biometrics template data.

8. The computer system according to claim 7, wherein the public block further stores an encryption/decryption application program, the private block further stores an encryption/decryption key, and the CPU loads the encryption/decryption application program and the encryption/decryption key to encrypt/decrypt the data stored in the private block.

9. The computer system according to claim 6, wherein the human-machine interface is displayed on the user interface of the computer apparatus.

10. The computer system according to claim 6, wherein after the booting operation is finished, the biometrics signal input device serves as a biometrics signal reader in the main operation system so as to input a biometrics signal to the computer apparatus.

11. The computer system according to claim 6, wherein the computer apparatus is configured such that the booting operation is disabled when the biometrics signal input device is disconnected from the computer apparatus.

* * * * *